(12) United States Patent
Ben Afeef (10) Patent No.: US 8,863,974 B2
(45) Date of Patent: Oct. 21, 2014

(54) FLOATING ROOF SUPPORT LEGS WITH VAPOR SEALS

(75) Inventor: Mohammed A. Ben Afeef, Jeddah (SA)

(73) Assignee: Saudi Arabian Oil Company, Dhahran (SA)

( * ) Notice: Subject to any disclaimer, the term of this patent is extended or adjusted under 35 U.S.C. 154(b) by 519 days.

(21) Appl. No.: 12/905,554

(22) Filed: Oct. 15, 2010

(65) Prior Publication Data

US 2012/0091135 A1 Apr. 19, 2012

(51) Int. Cl.
*B65D 88/64* (2006.01)
*F16J 15/10* (2006.01)
*B65D 88/40* (2006.01)

(52) U.S. Cl.
CPC .............. *F16J 15/106* (2013.01); *B65D 88/40* (2013.01)
USPC ........... 220/216; 220/220; 220/287; 285/235; 285/288.1; 285/189; 138/114; 138/103

(58) Field of Classification Search
CPC ............ F16J 15/08; F16J 15/46; F16J 15/48; F16J 15/027; F16J 15/106; B65D 88/40
USPC .......... 277/602, 607, 616, 615, 612; 220/220, 220/216, 287; 248/125.1, 125.3, 188.5, 248/161, 407, 159, 331, 354.1, 150, 351; 280/507, 506; 138/114, 103, 91, 94, 138/94.3, 97; 16/2.2
See application file for complete search history.

(56) References Cited

U.S. PATENT DOCUMENTS

| 2,563,017 | A | | 8/1951 | Field | |
|---|---|---|---|---|---|
| 2,764,184 | A | * | 9/1956 | Fitzhugh et al. | 138/89 |
| 3,338,454 | A | | 8/1967 | Nelson | |
| 3,576,210 | A | * | 4/1971 | Trent | 165/104.26 |
| 3,638,970 | A | | 2/1972 | Sandquist et al. | |
| 3,953,029 | A | * | 4/1976 | Boyd | 473/575 |
| 4,116,474 | A | * | 9/1978 | Wolf | 285/110 |
| 4,620,330 | A | * | 11/1986 | Izzi, Sr. | 4/288 |
| 4,949,797 | A | * | 8/1990 | Isom | 175/317 |
| 5,353,941 | A | | 10/1994 | Benvegnu | |
| 5,449,084 | A | * | 9/1995 | Wade | 220/216 |
| 5,628,421 | A | | 5/1997 | Jolly | |
| 2004/0164549 | A1 | * | 8/2004 | McAlpine | 285/235 |
| 2009/0084923 | A1 | * | 4/2009 | Lin | 248/407 |

OTHER PUBLICATIONS

International Search Report and Written Opinion of the International Searching Authority, Feb. 28, 2012.

* cited by examiner

*Primary Examiner* — Andrew Perreault
*Assistant Examiner* — James M Van Buskirk
(74) *Attorney, Agent, or Firm* — Abelman, Frayne & Schwab

(57) ABSTRACT

A column assembly for supporting a floating roof used with a storage tank for containing a volatile fluid, including an inner pipe, an outer pipe securable to the floating roof to extend below and generally perpendicular to the roof, the outer pipe surrounding and being movable axially on the inner pipe with a generally annular space defined between them, a pin extendable transversely through the overlapping walls of the inner and outer pipes to releasably fix the axial position of one pipe relative to the other, and a cylindrical sleeve seal having an upper part to slidably engage the inner pipe outer surface, a lower part bore surface to engage the top end outer surface of the outer pipe, and a radially inward extending rib situated axially between the upper and lower parts and extending transversely across and closing the top end of the annular space between the pipes.

18 Claims, 5 Drawing Sheets

FLOATING ROOF SUPPORT LEGS WITH VAPOR SEALS

I. FIELD OF THE INVENTION

This invention relates to vertically adjustable height support legs for a floating roof used in connection with a storage tank for volatile liquid, and particularly for a sealing system to reduce escape of vapor of said volatile liquid through said support legs.

II. BACKGROUND AND PRIOR ART

Storage tanks with floating roofs are widely used to store liquid petroleum products. With such storage there are numerous potential problems which include but are not limited to:
(a) damage to the floating roof from excessive accumulated rain water atop the roof,
(b) escape of flammable and/or pollution-causing vapors upward through an emergency drainage duct for said accumulated rain water, and
(c) escape of said flammable and/or pollution causing vapors upward through vertically extendable support legs provided to support said floating roof in selected elevations. The present invention focuses on the third of the above-listed potential problems, namely escape of vapors through the support legs. At certain times liquid petroleum is removed from below a floating roof so that maintenance persons can access pipes and apparatus at the lower portion of the tank below the roof. The support legs for floating roofs may have various constructions, and the present invention pertains to known support legs where each is formed of a tubular column that is telescopically extendable, and where dangerous vapors may escape through the legs while stationary or while being extended between their low and high positions.

The low position of typically one-to-three feet above the tank bottom, is needed in many tanks for the floating roof to be clear of the pipes and other apparatus located near the bottom of the tank. The high position which might be about seven feet above the bottom is to provide headroom for workers to move about, clean and repair the interior of the tank. Multiple heights are necessary, because if the support columns provided only a single relatively high elevation, there could be an accumulation of vapor in the tank below the roof when the liquid level falls below the high position. Thus, these support columns are axially extendable, and conventional support columns have construction where vapors can escape upward through the columns.

A variety of known methods have been employed to seal the openings where vapor escapes through these support legs, but such methods are unsatisfactory because they are expensive, unsightly, and/or prone to deteriorate when exposed to some tank vapors or sunlight.

A conventional type of seal is described in the two prior art patents discussed below. U.S. Pat. No. 5,305,905 discloses a floating roof with a downward extending leg to support the roof at a selected elevation if the volatile fluid is removed from beneath such floating roof. This patent proposes to block volatile fumes from escaping upward through the annular space between the inner support leg and the outer sleeve secured to the floating roof, by simply employing a blind flange and a gasket across the top of the annular space. To support the floating roof at different elevations, one must replace the first leg with a larger one. This disclosure does not address the problem of leakage of volatile fumes when an inner leg is extendible upward through and beyond the top of the outer sleeve that is secured to the floating roof.

Prior art U.S. Pat. No. 5,353,941 discloses another method for reducing vapor loss through the annular space of a support leg; however, the proposed solution is essentially to have the inner pipe of the support leg pass through a hole in a seal which applies a wiping effect.

Still additional examples of prior art wiping gaskets are seen in U.S. Pat. Nos. 4,243,151, 5,829,621, 3,409,165 and 3,583,594.

A typical prior art support leg for use with a floating roof as described above, comprises a central leg and an outer sleeve or pipe slidable on said central leg and fixable at different elevations by a pin extending transversely through holes in the walls of the sleeve and the central leg. In one arrangement there are a series of holes extending through the opposite walls of the leg at different elevations, and at least one set of holes extending through opposite walls of the sleeve, for coupling the sleeve with the central leg at said different elevations. While the top and bottom ends of the leg may be sealed closed, these holes in the walls of the sleeve and the leg represent potential avenues for volatile liquid evaporated from the tank to escape into the upper region of the tank and/or outside of the tank.

The vapor that escapes through said holes in the walls of the leg, originates from the liquid in the tank and rises upward through the annular space between said sleeve and central leg. Such annular space begins at the bottom end of the sleeve which is necessarily open so that it can slide upward or downward lengthwise on said leg to selected elevations on said leg.

The support leg vapor seals of this invention are intended to reduce or preferably prevent escape of vapors from volatile liquid contained in a storage tank with a floating roof. In particular, the invention is to prevent or reduce escape of said vapors from the floating roof support legs.

A typical support column includes as the support leg preferably round cylindrical tube or inner pipe, and an outer pipe or sleeve of shorter length slidably situated concentrically outward of said inner pipe, with certain annular clearance between the inner pipe and sleeve to allow for free sliding therebetween. The outer pipe is secured to the floating roof, so that when the floating roof descends or liquid is pumped out of the tank to be inspected, cleaned or maintained, the roof will be barred from descending lower than allowed by the support legs extending below the roof.

III. OBJECTS AND SUMMARY OF THE INVENTION

A first object of the present invention is to provide a system of vapor seals for a support column for a floating roof of a liquid petroleum in a storage tank.

A further object of the present invention for said system of vapor seals to include a primary seal for the annular space between inner and outer pipes of the support column.

Another object is for the vapor seal system to include also a secondary seal for the transversely extending holes in the walls of said inner and outer pipes through which is removably positioned a coupling pin.

A still further object of the present invention is for said primary seal to be formed as an elastic sleeve having a lower part that overlies the upper end of said outer pipe, an upper part that overlies said inner pipe, and a mid-part that extends radially inwardly and closes the top end of the annular space between said outer and inner pipes.

An additional object of the present invention is for said mid-part of said primary seal sleeve to have a radially inward extending rib or ring to close said annular space, while said upper and lower parts of said primary seal sleeve resiliently engage said outer and inner pipes respectively.

Another object of the present invention is for said secondary seal to be formed as an elastic sleeve having a pair of projections extending radially inward, opposite and coaxial with each other. In a preferred version, each projection has a truncated conical shape with its base at the inner surface of said elastic sleeve and its radially inward top part of smaller diameter dimensioned to enter and seal one of said holes in the wall of said inner pipe.

A further object of this invention is to provide for said primary seal an elastic sleeve whose lower and upper parts have larger and smaller diameters respectively corresponding to said outer and inner pipes of said support column.

A first embodiment of the present invention is a support column assembly for supporting a floating roof used with a storage tank for a volatile fluid, comprising:
a. an inner pipe formed by a cylindrical wall having top and bottom ends,
b. an outer pipe secured to said floating roof, said outer pipe formed by a cylindrical wall having top and bottom ends, said outer pipe surrounding and being movable axially on said inner pipe with a generally annular space defined between said inner and outer pipes, said generally annular space having opposite top and bottom ends,
c. a first set of coaxial holes extending transversely through opposite sides of said wall of said outer pipe
d. a second set of coaxial holes extending transversely through opposite sides of said wall of said inner pipe,
e. said first and second sets of holes dimensioned to receive a pin extendible through both sets at once when said first and second sets of holes are axially aligned, which thereby fixes said outer pipe and floating roof when secured thereto at a predetermined axial position relative to said inner pipe, and
f. a primary seal formed as a cylindrical sleeve having upper and lower parts each with bore surfaces, said upper part bore surface being adapted to slidably engage said inner pipe outer surface, and said lower part bore surface adapted to engage said top end outer surface of said outer pipe, said primary seal further comprising a radially inward extending rib situated axially between said upper and lower part bore surfaces and extending transversely across and closing said top end of said annular space when said primary seal is positioned to engage said inner and outer pipes.

A second embodiment is a support column assembly according to the first embodiment wherein said inner and outer pipes are round cylinders and are generally coaxial and have a common central longitudinal axis.

A third embodiment is a support column assembly according to the second embodiment wherein said first and second sets of coaxial holes each extend along a line generally perpendicular to said central longitudinal axis of said inner and outer pipe respectively.

A fourth embodiment is a support column assembly according to the third embodiment wherein said line extends through said central longitudinal axis of each of said inner and outer pipes.

A fifth embodiment is a support column assembly according to the first embodiment wherein said primary seal is elastic.

A sixth embodiment is a support column according to the first embodiment wherein said inner pipe top and bottom ends are closed.

Figure 4:
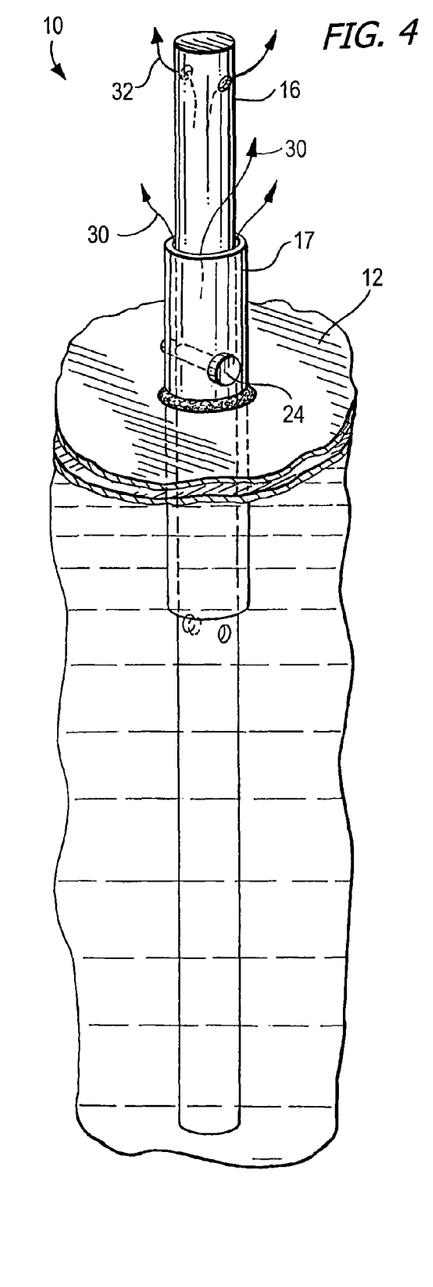
FIG. 4 is a fragmentary top front perspective view in section of the support column in FIG. 1 showing escape of vapor from volatile liquid in said storage tank.
Figure 5:
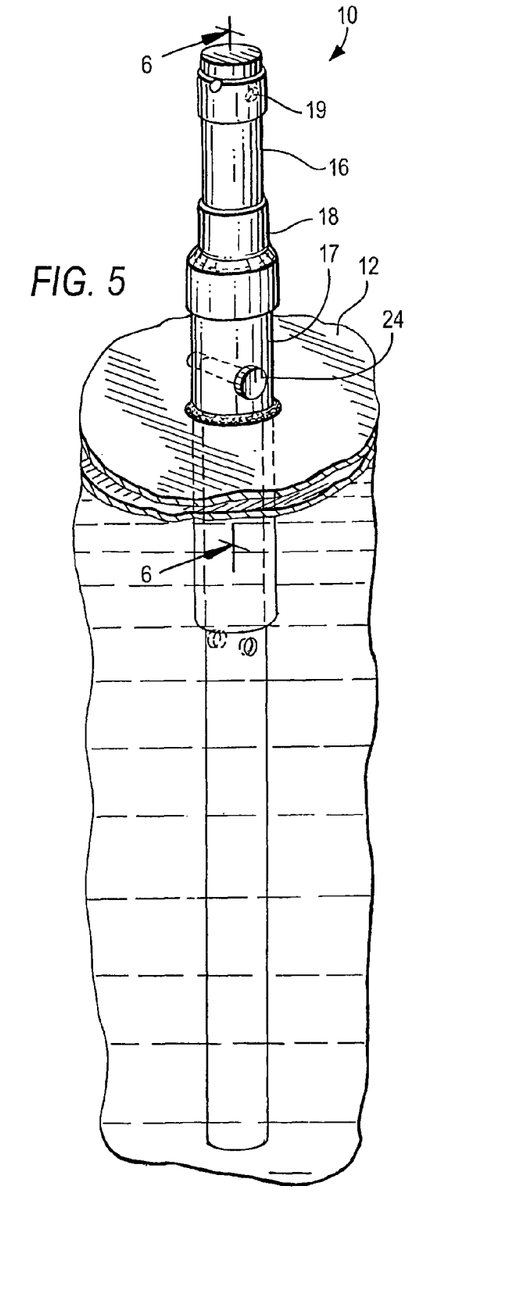
FIG. 5 is similar to FIG. 4 showing a support column with the new vapor seal system including primary and secondary seals.

A $7^{th}$ embodiment is a support column according to the $5^{th}$ embodiment wherein said inner pipe has a plurality of said $2^{nd}$ sets of holes, each of said $2^{nd}$ sets of holes being axially spaced apart at a predetermined axial location from the other as seen in FIGS. 4 and 5.

An eighth embodiment is a support column assembly according to the first embodiment wherein said primary seal upper and lower parts have smaller and larger diameters respectively corresponding generally to said inner and outer pipes engaged by said upper and lower parts respectively.

A ninth embodiment is a support column assembly according to the first embodiment wherein said primary seal is a unitary contiguous molded article.

A tenth embodiment is a support column assembly according to the first embodiment wherein said primary seal lower part is dimensioned to tightly engage said outer pipe.

An eleventh embodiment is a support column assembly according to the first embodiment further comprising a secondary seal formed as an elastic cylindrical sleeve having a central longitudinal axis and removably attached to the outer surface of said inner pipe and covering said second set of holes, said secondary seal including a set of two radially inward projecting plugs extending from opposite sides of said sleeve along a line generally perpendicular to and through said central longitudinal axis thereof, said plugs adapted to extend into said second set of opposite holes.

A twelfth embodiment is a support column assembly according to the eleventh embodiment wherein said secondary seal is formed as a tubular wall with opposite inner and outer surfaces, each of said plugs having a generally truncated conical shape with the base of the plug situated at said inner surface of said inner surface of said tubular wall.

A thirteenth embodiment is a support column assembly according to the first embodiment wherein said primary seal sleeve comprises an upper part adapted to engage and slide onto said outer pipe, a lower part adapted to engage and slide onto said inner pipe, and a mid-part between said upper and lower parts, and wherein said rib extends radially inward from said mid-part, and where said lower part has inner diameter greater than outer diameter of said upper part.

A fourteenth embodiment is a support column assembly according to the first embodiment wherein said outer pipe extends vertically through said floating roof and is fixed thereto, said outer pipe having top and bottom parts respectively extending above and below said floating roof.

A fifteenth embodiment is a support column assembly according to the seventh embodiment further comprising one of said secondary seal for sealing each of said second sets of holes A sixteenth embodiment is a floating roof assembly for a storage tank for containing a volatile fluid, comprising:
A. a roof adapted to float atop a volatile liquid in a storage tank,
B. a plurality of support columns, each comprising:
   a. an inner pipe formed by a cylindrical wall having top and bottom ends,
   b. an outer pipe secured to said floating roof and extending below and generally perpendicular to the plane of said roof, said outer pipe formed by a cylindrical wall having top and bottom ends, said outer pipe surrounding and being movable axially on said inner pipe with a generally annular space defined between said inner and outer pipes, said generally annular space having opposite top and bottom ends, said plurality of support columns each extending downward from said floating roof and spaced apart laterally from each other, c. said outer pipe having a first set of coaxial holes extending transversely through opposite sides of said wall of said outer pipe d. said inner pipe having a second set of coaxial holes extending transversely through opposite sides of said wall of said inner pipe, e. said first and second sets of holes dimensioned to receive a pin extendible through both sets at once when said first and second sets of holes are axially aligned, which thereby fixes said outer pipe and floating roof secured to said outer pipe at a predetermined axial position relative to said inner pipe and fixes said floating roof at a predetermined elevation above the bottom end of said inner pipe, and f. a primary seal formed as a cylindrical sleeve having upper and lower parts each with bore surfaces, said upper part bore surface being adapted to slidably engage said inner pipe outer surface, and said lower part bore surface adapted to engage said top end outer surface of said outer pipe, said primary seal further comprising a radially inward extending rib situated axially between said upper and lower part bore surfaces and extending transversely across and closing said top end of said annular space when said primary seal is positioned to engage said inner and outer pipes.

IV. BRIEF DESCRIPTION OF THE DRAWINGS

The invention will be described in further detail below and with reference to the attached drawings and illustrations in which.

V. DETAILED DESCRIPTION OF THE PREFERRED EMBODIMENTS

Figure 1:
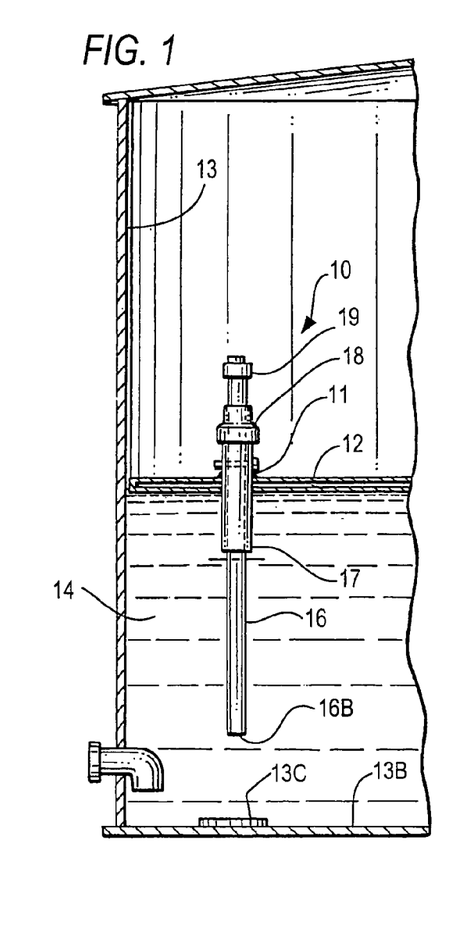
FIG. 1 is a side elevation view partly cut away and in section of a storage tank for a volatile fluid with a floating roof showing one typical adjustable support column and with the roof floating in partially elevated state.

FIG. 1 illustrates the new support column assembly 10 secured by a weld or other connector 11, a floating roof 12 in a storage tank 13 containing a volatile or other fluid 14. As seen in this Figure, roof 12 is floating atop liquid 14, and support column 10 secured to the roof has its lower end suspended above the bottom 13B of storage tank 13. As will be described in detail later, support column 10 comprises inner pipe 16, outer pipe 17, primary seal 18 and secondary seal 19.

Figure 2:
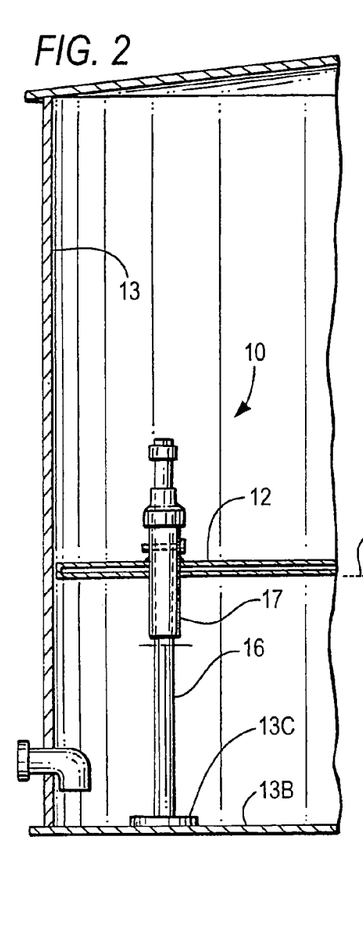
FIG. 2 is similar to FIG. 1 with the volatile liquid removed and the roof supported by support columns at a first low elevation.

As seen in FIG. 2, when volatile liquid 14 is drained out of tank 13, roof 12 floating atop the liquid will descend until the bottom end 16B of the inner pipe 16 of support column 10 reaches the storage tank bottom 13 or reaches a stop element 13C as shown. In FIG. 2 fluid 14 is schematically illustrated as being fully or at least substantially drained or pumped out of tank 13. Accordingly, roof 12 while no longer supported by liquid, is adequately supported at elevation E1 by a plurality of laterally spaced apart support columns 10, of which only one is shown. At this elevation E1 roof 12 is high enough for maintenance, construction or inspection personnel to walk about under the roof supported by support columns.

Figure 3:
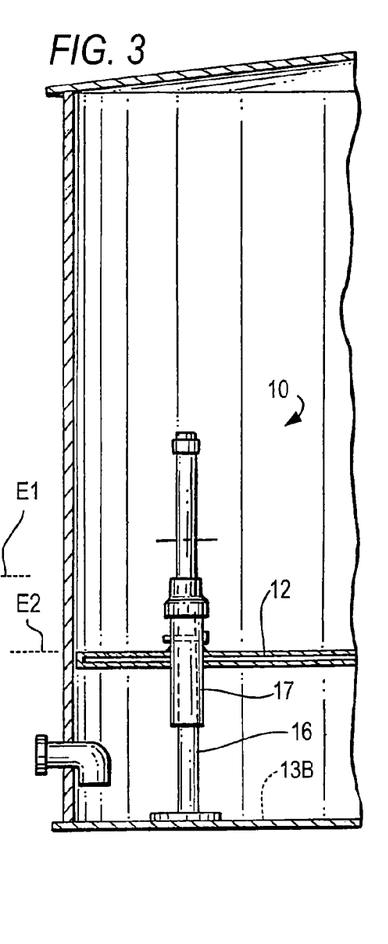
FIG. 3 is similar to FIG. 2 with the volatile liquid removed and the roof supported by the support columns at a second elevation lower than said first low elevation.

FIG. 3 shows support column 10 adjusted to support roof 12 at a still lower elevation E2 which is shown schematically, but intended to be low enough to significantly reduce the space in which fumes from the volatile liquid can accumulate, while also adequately supporting roof 12 from breaking or becoming otherwise damaged.

Figure 6:
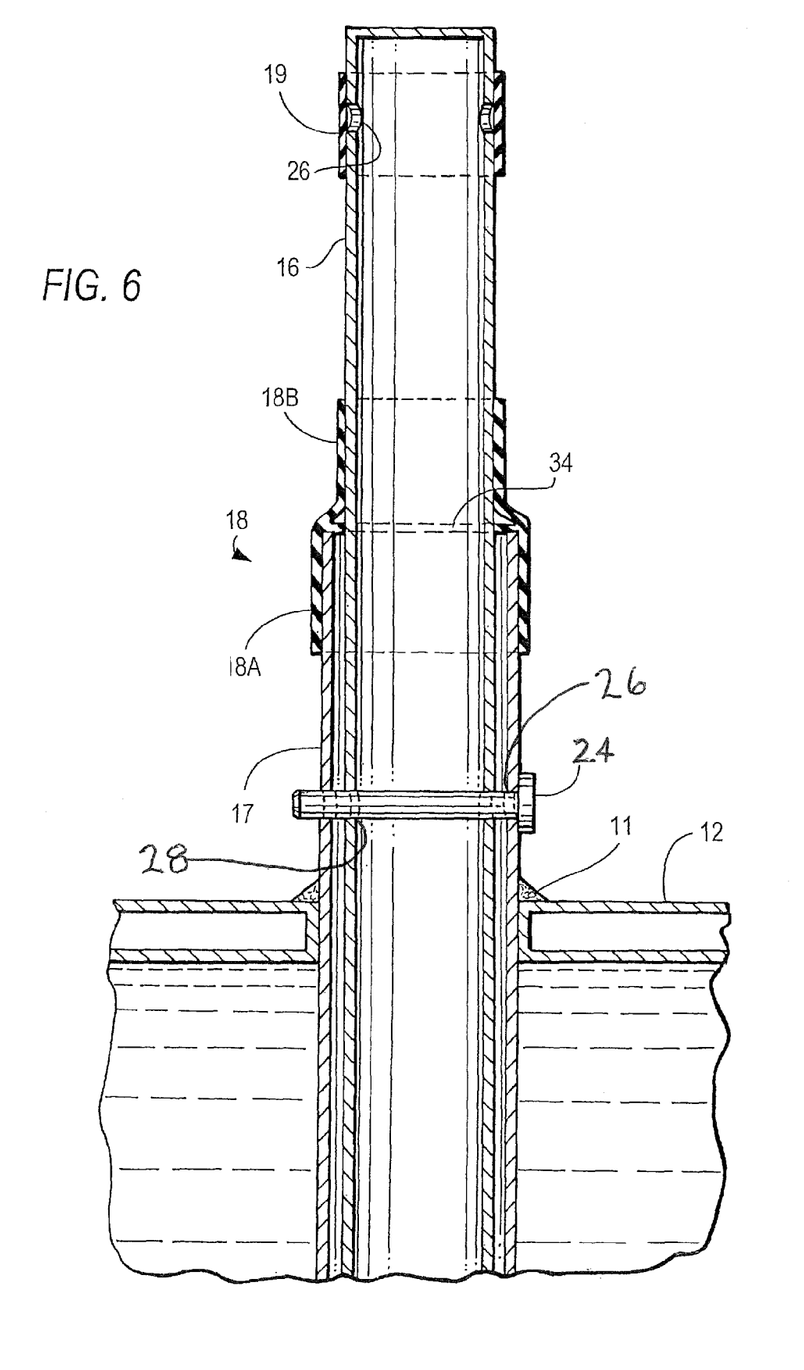
FIG. 6 is an enlarged fragmentary elevation view in section of the vapor seal system on a support column of FIG. 5.

FIG. 6 also shows weld 11 by which floating roof 12 is secured to outer pipe 17; however, many alternate forms of connection are possible, both rigid and flexible.

FIGS. 4-5 further illustrate support column 10 in enlarged detail where support column 10 includes inner pipe or leg 16, outer pipe 17, primary seal 18 closing the top end of annular space 22 (see FIG. 4) at the top end of outer pipe 17 as it surrounds inner pipe 16. These Figures also show secondary seal 19 at an upper portion of inner leg 16. Outer pipe 17 is positionable and securable at the different elevations on leg 16 when pin 24 extends through horizontally directed holes 26 and 28 (see FIG. 6) in the walls of outer and inner pipes 17 and 16 respectively.

In FIG. 4 vapor emissions 30 escaping through annular space 22 and further vapor emissions indicated by arrows 32, are shown escaping through pin holes 26 at an upper location on inner pipe 15.

FIG. 5 shows the support column 10 of FIG. 3 with the installation thereon of primary seal 18 for closing the top end of annular space 22, and the secondary seal 19 closing pin holes 26.

FIG. 6 shows an enlarged cross-sectional elevation view of support column 10, including primary seal 18 and secondary seal 19. This figure shows further detail of primary seal 18, namely its rib 34 which extends radially inward for closing the top open end of annular space 22 when this seal is installed onto the top end of outer pipe 17 and engaging inner pipe 16. Primary seal 18 and secondary seal 19 are molded unitary elastic sleeves which may be made of hydrogenated nitrile rubber, other aromatics and M.T.B.E., U/V resistant material.

Figure 7:
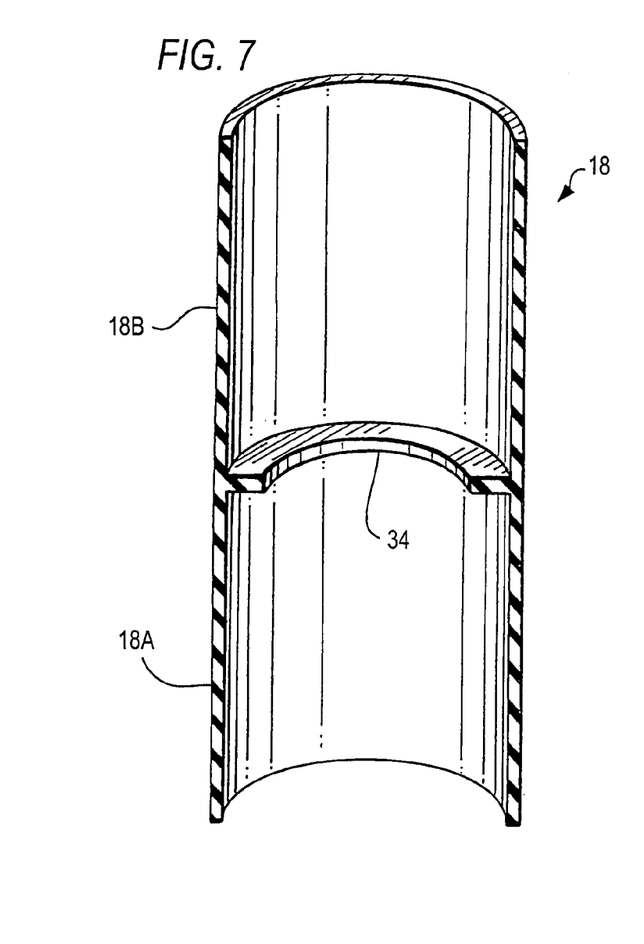
FIG. 7 is an elevational view in section of a first embodiment of the primary seal of the vapor seal system of FIG. 6.

FIG. 7 shows primary seal 18 alone and in relaxed or unstretched state with its inward extending rib 34 and with top and bottom parts 18B, 18A both having the same inside diameter. FIG. 6 also shows how the primary seal's lower part 18A is stretched substantially to resiliently fit onto the top end of outer pipe 17, and its upper part 18B is stretched moderately to resiliently fit onto the outer surface of inner pipe 16.

Figure 8:
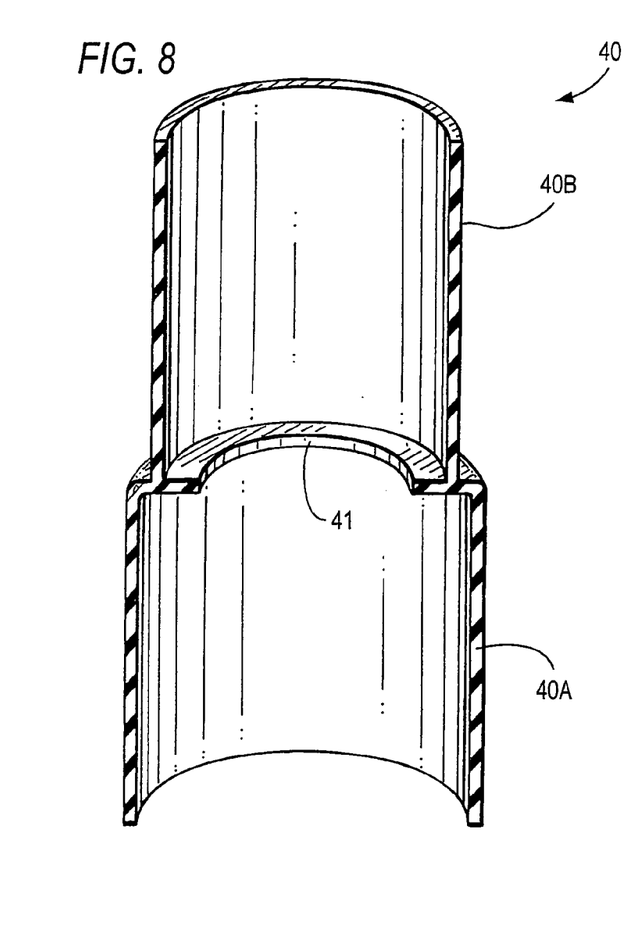
FIG. 8 is similar to FIG. 7 showing a second embodiment of the primary seal.

FIG. 8 shows an alternate version 40 of such primary seal, where the lower part 40A has a larger diameter than the upper part 40B, to more easily fit onto the outer and inner pipes respectively. This sleeve has inward extending rib 41 similar to rib 34 in FIG. 7.

Figure 9:
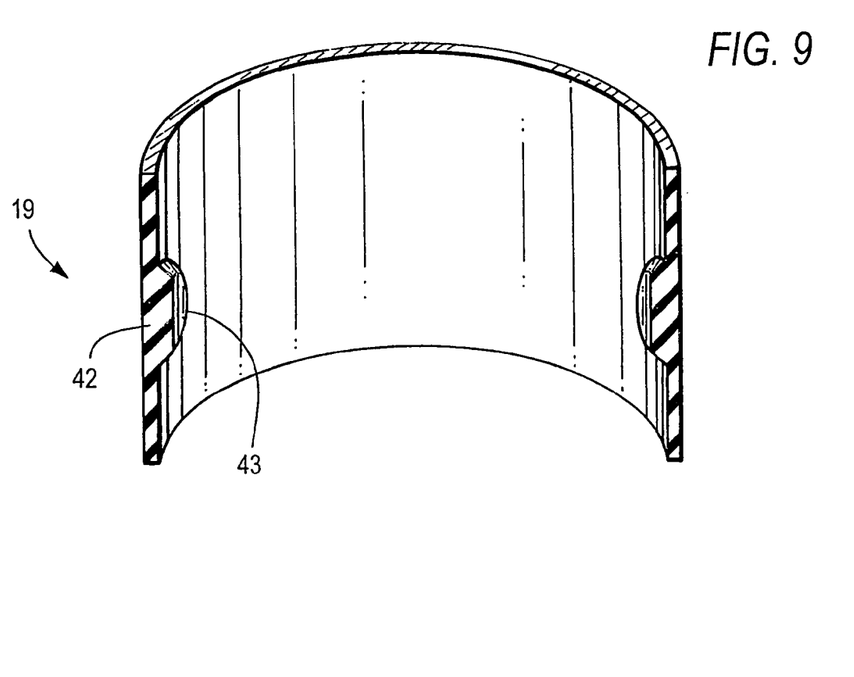
FIG. 9 is a top front perspective view in section of the secondary seal.
Figure 10:
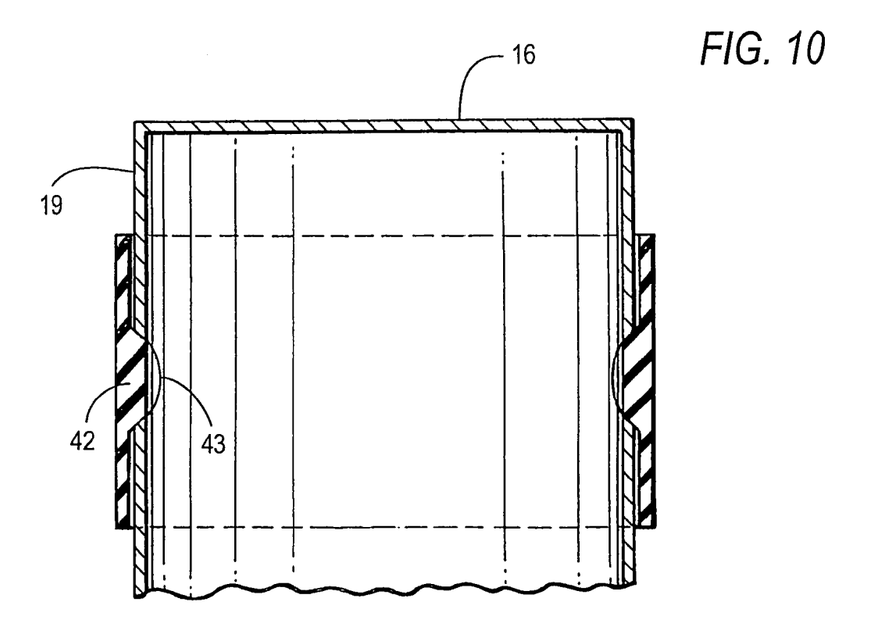
FIG. 10 is a fragmentary front elevation view in section of said secondary seal of FIG. 9 shown in this figure as positioned on an inner pipe.

FIGS. 9 and 10 show the secondary vapor seal 19 where FIG. 9 is a perspective view in section of the secondary seal alone, and FIG. 10 is an elevation view in section of the same seal shown surrounding inner pipe 16. Seal 19 has inside diameter dimensioned to accommodate and slide onto inner pipe 16, and it has two generally truncated conical shaped plug elements 42 extending radially inwardly and dimensioned for the inward end 43 of each plug element to fit onto one of the opposite aligned pin holes 26 (see FIG. 6) in inner leg 16. Because of the elasticity of this secondary seal, these projections 42 will easily and securely snap into and seal holes 26.

As seen in FIG. 6 the top of inner pipe 16, is permanently closed, but there are axially spaced holes 26 in the walls of this pipe. A secondary seal 19 can be removably secured over each set of holes 26, or at least over those holes above the primary seal 18. Vapor leakage through holes 26 in the wall of pipe 16 below the primary seal would be blocked by the primary seal. In practice, a floating roof would employ a plurality of laterally spaced support columns as described herein. It is preferred that both the primary and secondary seals be used in combination; however, use by at least one would be beneficial in reducing vapor leakage.

The dimensions of a preferred embodiment of the above-described support column and set of primary and secondary vapor seals are as follows:

A. Where the inner pipe has outer diameter d1,
  (1) the inside diameter d2 of the primary seal in its relaxed (upstretched) state is d1-20 mm,
  (2) the inside diameter d3 of the inward extending sealing rib is d1-40 mm,
  (3) the outside diameter of the outer pipe d4 is greater than d1, and
  (4) the wall thickness t1 of the primary seal sleeve is 3 mm, and said elastic primary seal sleeve is stretched to slide onto said inner and outer pipes.

B. Where the inner pipe's hole 26 has inside diameter d6,
  (1) the truncated conical shaped plug 38 of said secondary seal has a base diameter d7=d6+4 mm and a tip diameter d8=d6=4 mm,
  (2) said secondary seal sleeve in its relaxed state has inside diameter d9=d6−20 mm, and
  (3) said secondary seal sleeve has wall thickness t2 of 3 mm.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications and variations which fall within the spirit and scope of the appended claims.

The invention claimed is:

1. A support column assembly for supporting a floating roof defining a generally horizontal plane that is used as a top closure for a storage tank, comprising:
  a. an inner pipe formed by a cylindrical wall having top and bottom ends and having a central longitudinal axis therethrough,
  b. an outer pipe securable to said floating roof whereby it will to extend below and generally perpendicular to the plane of said roof, said outer pipe formed by a cylindrical wall having top and bottom ends and having a central longitudinal axis therethrough, said outer pipe surrounding and being movable axially with respect to said inner pipe between different predetermined axial locations relative to said inner pipe, and with a generally annular space defined between said inner and outer pipes, said generally annular space having opposite top and bottom ends,
  c. a first set of coaxial holes extending generally perpendicularly to said central longitudinal axis thereof and through opposite sides of said wall of said outer pipe,
  d. a second set of coaxial holes extending generally perpendicularly to said central longitudinal axis thereof and through opposite sides of said wall of said inner pipe,
  e. said first and second sets of holes dimensioned to receive a pin extendible generally perpendicular to said central longitudinal axis of said pipes and through both sets of holes at once when said outer pipe is at a selected one of said predetermined axial locations relative to said inner pipe and said first and second sets of holes are axially aligned, and
  f. a primary seal formed as an elastic cylindrical sleeve having upper and lower parts each with bore surfaces, said upper part bore surface being adapted to slidably engage said inner pipe outer surface, and said lower part bore surface adapted to resiliently engage said top end outer surface of said outer pipe, said primary seal further comprising a radially inward extending rib situated axially between said upper and lower part bore surfaces and extending transversely across and closing said top end of said annular space when said primary seal is positioned to engage said inner and outer pipes.

2. The support column assembly according to claim 1 wherein said inner and outer pipes are round cylinders and are generally coaxial and have a common central longitudinal axis.

3. The support column assembly according to claim 1 wherein said inner pipe top and bottom ends are closed.

4. The support column assembly according to claim 1 wherein said outer pipe has greater diameter than that of said inner pipe, and said primary seal upper and lower parts have smaller and larger diameters respectively corresponding generally to said inner and outer pipes engaged by said upper and lower parts respectively.

5. The support column assembly according to claim 1 wherein said primary seal is a unitary contiguous molded article.

6. The support column assembly according to claim 1 wherein said primary seal lower part is dimensioned to tightly engage said outer pipe.

7. The support column assembly according to claim 1 further comprising a secondary seal formed as an elastic cylindrical sleeve having a central longitudinal axis and removably attached to the outer surface of said inner pipe and covering said second set of holes, said secondary seal including a set of two radially inward projecting plugs extending from opposite sides of said sleeve along a line generally perpendicular to and through said central longitudinal axis thereof, said plugs adapted to extend into said second set of opposite holes.

8. The support column assembly according to claim 7 wherein said secondary seal is formed as a tubular wall with opposite inner and outer surfaces, each of said plugs having a generally truncated conical shape with the base of the plug situated at said inner surface of said inner surface of said tubular wall.

9. The support column assembly according to claim 1 wherein said primary seal sleeve comprises an upper part adapted to engage and slide onto said inner pipe top part, a lower part adapted to engage and slide onto said outer pipe, and a mid-part between said upper and lower parts with a rib extending radially inward from said inner bore surface of said lower part and extending around the circumference thereof, and where said lower part has inner diameter greater than outer diameter of said outer tube's upper part.

10. The support column assembly according to claim 1 wherein said outer pipe has length $L_1$ less than length $L_2$ of said inner pipe.

11. A The support column assembly according to claim 1 wherein said outer pipe extends vertically through said floating roof and is fixed thereto, said outer pipe having top and bottom parts respectively extending above and below said floating roof.

12. A The support column assembly according to claim 11 wherein said outer pipe where it intersects said floating roof is sealed from flow therethrough of liquid or gas of said volatile fluid.

13. A The support column assembly according to claim 7 further comprising one of said secondary seals for sealing each of said second sets of holes.

14. A storage tank assembly comprising (1) a volatile fluid storage tank having an open top, (2) a floating roof defining a generally horizontal plane for closing said open top, and (3), a plurality of support columns, each comprising:
  a. an inner pipe formed by a cylindrical wall having top and bottom ends and having a central longitudinal axis therethrough,
  b. an outer pipe secured to said floating roof and extending below and generally perpendicular to the plane of said roof, said outer pipe formed by a cylindrical wall having top and bottom ends and having a central longitudinal axis therethrough, said outer pipe surrounding and being movable axially on said inner pipe between different predetermined axial locations relative to said inner pipe, and with a generally annular space defined between said inner and outer pipes, said generally annular space having opposite top and bottom ends,
  c. a coupling element fixed to said outer pipe and releasably attachable to said inner pipe at selected ones of said predetermined positions along its length, which thereby fixes said outer pipe and floating roof secured to said outer pipe at a said selected predetermined axial positions relative to said inner pipe and fixes said floating roof at a predetermined elevation above the bottom end of said inner pipe, and
  d. a primary seal formed as an elastic cylindrical sleeve having upper and lower parts each with bore surfaces, said upper part bore surface being adapted to slidably engage said inner pipe outer surface, and said lower part bore surface adapted to resiliently engage said top end outer surface of said outer pipe, said primary seal further comprising a radially inward extending rib situated axially between said upper and lower part bore surfaces and extending transversely across and closing said top end of said annular space when said primary seal is positioned to engage said inner and outer pipes.

15. The storage tank assembly support column assembly according to claim 14 wherein said outer pipe extends upward above the top surface of said floating roof.

16. A floating roof and support column assembly, comprising a floating roof defining a generally horizontal plane and having top and bottom surfaces and a plurality of support columns, each of said support columns comprising:
  a. an inner pipe formed by a cylindrical wall having top and bottom ends and having a central longitudinal axis therethrough, and
  b. an outer pipe securable to said floating roof to extend below and generally perpendicular to the plane of said roof, said outer pipe formed by a cylindrical wall having top and bottom ends of a having a central longitudinal axis therethrough, said outer pipe surrounding and being movable axially on said inner pipe with a generally annular space defined between said inner and outer pipes, said generally annular space having opposite top and bottom ends, each of said outer support columns extending downward from said floating roof and spaced apart laterally from each other,
  c. said outer pipe having a first set of coaxial holes extending transversely through opposite sides of said wall of said outer pipe,
  d. said inner pipe having a second set of coaxial holes extending transversely through opposite sides of said wall of said inner pipe,
  e. said first and second sets of holes dimensioned to receive a pin extendible generally perpendicular to said central longitudinal axes of said pipes and through both sets at once when said first and second sets of holes are axially aligned move, which thereby fixes said outer pipe and floating roof secured to said outer pipe at a predetermined axial position relative to said inner pipe, and
  f. each of said support columns further comprising a primary seal formed as an elastic cylindrical sleeve having upper and lower parts each with bore surfaces, said upper part bore surface being adapted to slidably engage said inner pipe outer surface, and said lower part bore surface adapted to resiliently engage said top end outer surface of said outer pipe, said primary seal further comprising a radially inward extending rib situated axially between said upper and lower part bore surfaces and extending transversely across and closing said top end of said annular space when said primary seal is positioned to engage said inner and outer pipes.

17. An elastic seal for closing one end of an annular space formed between an inner pipe and an outer pipe surrounding said inner pipe and axially movable relative to said inner pipe, said seal formed as a cylindrical sleeve comprising in the axial direction upper and lower parts each with bore surfaces, said upper part bore surface being adapted to slidably engage the outer surface of said inner pipe, and said lower part bore surface adapted to resiliently engage the outer surface of said outer pipe, said seal further comprising a radially inward extending rib situated axially between said upper and lower part bore surfaces and extending radially inward and defining a ring with an inner bore diameter smaller than the inside diameter of said sleeve and in its relaxed state smaller than the outer diameter of said inner pipe and of said outer pipe, said ring's axially facing surface being adapted to close and seal said annular space between said pipes, and said bore surface adapted to slide and seal against said inner pipe's outer surface.

18. The elastic seal according to claim 17 wherein said upper part of said sleeve having in its relaxed state smaller inside diameter than that of said lower part of said sleeve and said rib extending radially inward from said bore surface of said lower part.

* * * * *